(12) United States Patent
Hao et al.

(10) Patent No.: US 8,089,191 B2
(45) Date of Patent: Jan. 3, 2012

(54) ELECTRIC MACHINE AND CONTROL METHOD

(75) Inventors: Lei Hao, Troy, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 379 days.

(21) Appl. No.: 12/421,001

(22) Filed: Apr. 9, 2009

(65) Prior Publication Data

US 2010/0259208 A1 Oct. 14, 2010

(51) Int. Cl.
  *H02K 23/46* (2006.01)
(52) U.S. Cl. .................................. 310/190; 318/538
(58) Field of Classification Search .......... 318/538–542; 310/190–192
  See application file for complete search history.

(56) References Cited

U.S. PATENT DOCUMENTS

| | | | |
|---|---|---|---|
| 2,675,494 A | 4/1954 | Ellis | |
| 3,017,528 A | 1/1962 | Ellis | |
| 3,077,548 A | 2/1963 | Moressee et al. | |
| 3,469,130 A | 9/1969 | Jines et al. | |
| 3,584,250 A * | 6/1971 | Bottani | 310/98 |
| 3,648,090 A * | 3/1972 | Voin | 310/191 |
| 5,627,419 A * | 5/1997 | Miller | 310/74 |
| 5,821,710 A | 10/1998 | Masuzawa et al. | |
| 6,943,478 B2 | 9/2005 | Zepp et al. | |
| 7,034,427 B2 * | 4/2006 | Hirzel | 310/191 |
| 7,863,789 B2 * | 1/2011 | Zepp et al. | 310/90 |
| 7,960,888 B2 * | 6/2011 | Ai et al. | 310/190 |
| 2007/0236095 A1 | 10/2007 | Caiozza | |

* cited by examiner

*Primary Examiner* — Mark Budd
(74) *Attorney, Agent, or Firm* — Quinn Law Group, PLLC

(57) ABSTRACT

A method for controlling an electric machine includes measuring a motor control parameter or parameters and selectively positioning an adjustable member within the electric machine in response the motor control parameters. Selective positioning of the adjustable member varies the geometry of a flux path within the electric machine, thereby inducing a predetermined voltage output in the electric machine. An electric machine includes a rotor, a shaft operatively connected to the rotor to rotate in conjunction therewith, and a stator. An adjustable member is positioned between the rotor and the stator, and has a variable offset position that can be selected by an electronic control unit (ECU) and applied by an actuator to thereby vary the geometry of a flux path within the electric machine. The adjustable member can include a non-magnetic annular hub and magnetic radial arms and axial extensions.

15 Claims, 4 Drawing Sheets

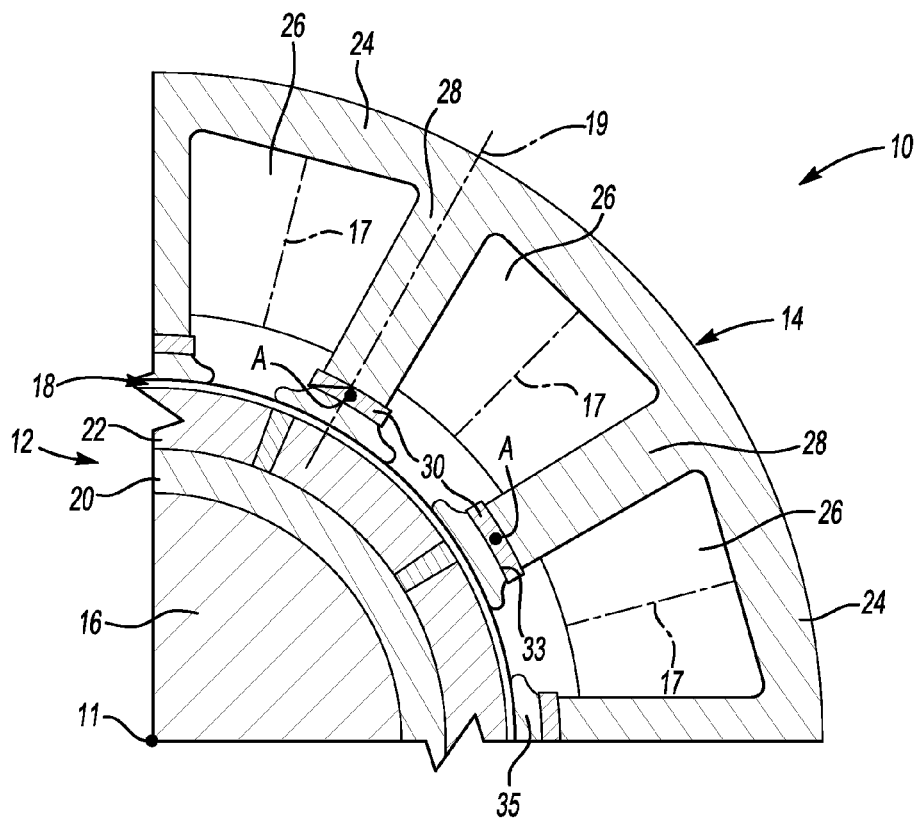
*Fig-1C*
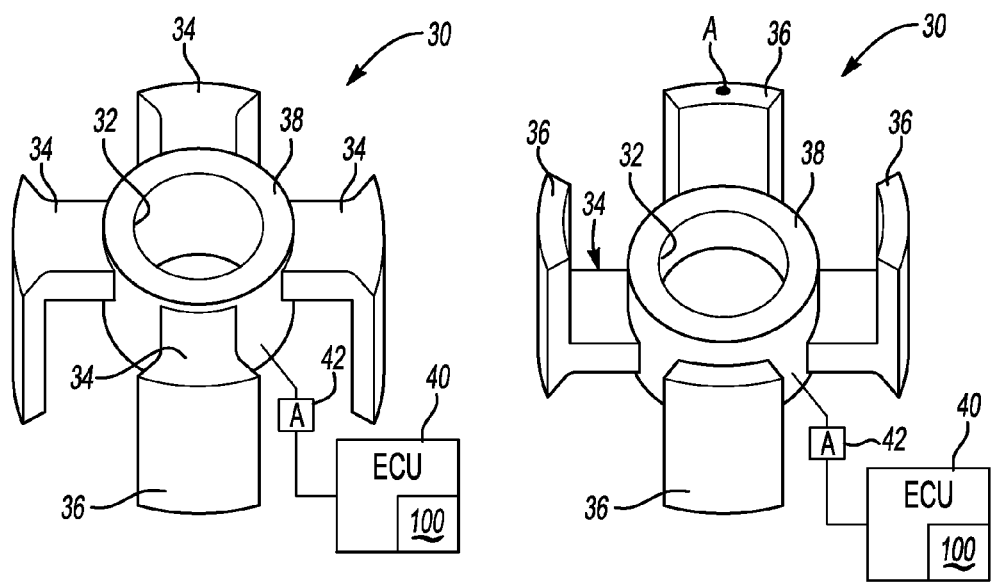
*Fig-2A*   *Fig-2B*

ELECTRIC MACHINE AND CONTROL METHOD

TECHNICAL FIELD

The present invention relates to an electric machine or motor/generator, and in particular to an electric machine having a controllable induced output voltage and a high torque/ampere ratio, as well as a method of controlling such a machine.

BACKGROUND OF THE INVENTION

In a hybrid electric vehicle or HEV, an electric machine or motor/generator can be used in conjunction with a high-voltage battery module in order to selectively propel the vehicle. In other vehicle designs, such as in a purely electric vehicle or PEV, the electric machine and battery module are used as the exclusive power source for vehicle propulsion. An electric machine configured as an induction-type AC device of the type known in the art can produce rotational motion or motor torque in response to an applied electrical current, and when operating in a generator mode the torque provided by the same device can be directed to generate electricity suitable for recharging the battery module, and/or for other useful purposes.

In particular, a conventional electric machine includes a rotatable member or rotor, a stationary member or stator, and a rotatable output shaft connected to or formed integrally with the rotor. An air gap can separate the stator and rotor. The main magnetic flux passes through the rotor core, as well as a rotor excitation layer, e.g., a permanent magnet, the air gap, and the stator core to thereby form a closed path, with the closed path magnetically linking the stator windings of the electric machine. The induced voltage within the electric machine is proportional to the total flux linking the stator windings.

To ensure proper operation of the motor/generators, as well as to optimize fuel economy of the vehicle, a motor controller or electronic control unit (ECU) can perform various measurements and/or diagnostics of the various electrical and mechanical systems aboard the vehicle, and can control the various modes of the electric machine as determined by programmed motor control logic. A high torque/ampere ratio and wide speed range are essential in certain applications, such as automotive propulsion and power generation applications. Since induced voltage is proportional to motor speed, a higher induced voltage can limit the available speed range of the electric machine as it approaches system bus voltage at a lower speed.

Typical machine control techniques account for this condition by selectively weakening the magnetic flux in the electric machine. For example, the amperage delivered to the stator windings can be increased in order to weaken the induced magnetic field. Such a technique can result in less than optimal machine efficiency while increasing inverter current requirements. Additionally, the power factor of the machine can be reduced using conventional methods, thus requiring more electrical current for a given required power output of the electric machine.

SUMMARY OF THE INVENTION

Accordingly, a control method is provided for achieving a high torque/ampere ratio and a high speed range in an electric machine having stator teeth, a stator core, and a rotor core by dynamically varying the geometry of a magnetic flux path in conjunction with the rotary speed of the electric machine. That is, the electric machine has two operating modes: a low-speed mode producing a maximum amount of output torque, and a high-speed mode producing a reduced amount of output torque. The magnetic flux linking the stator windings of the electric machine is controlled via an adjustable member which can be selectively positioned anywhere within the flux path to thereby link the magnetic flux in whole, in part, or not at all, as needed depending on the rotational speed of the electric machine.

During the low-speed mode, the adjustable member is aligned with the stator teeth of the electric machine so that magnetic flux fully links the adjustable member, the stator core, and the rotor core. During the high-speed mode, the adjustable member is fully misaligned with the stator teeth so that the magnetic flux has two flux paths: the linking or aligned flux path described above, and a secondary flux path that does not link the stator teeth, but rather passes through the adjustable member and the rotor core to form a closed loop. The secondary flux path effectively reduces the total magnetic flux linking the stator core, thereby reducing the induced voltage and output torque of the electric machine.

In particular, a method for controlling an electric machine includes measuring one or more motor control parameters and then selectively positioning an adjustable member to vary the magnetic flux and induced output voltage in response to the motor control parameters. The positioning of the adjustable member varies the geometry of the flux path within the electric machine, thereby producing a predetermined induced output voltage in the electric machine.

An electric machine includes a rotor, a shaft connected to or formed integrally with the rotor to rotate in conjunction therewith, a stator, an adjustable member, an actuator, and an electronic control unit or ECU. The adjustable member is positioned between the rotor and the stator and has a variable offset position, while the actuator is adapted to selectively position the adjustable member to thereby select the variable offset position. A variation in the variable offset position in conjunction with a speed of the electric machine varies the geometry of a flux path within the electric machine, thereby producing a predetermined induced voltage output in the electric machine.

The offset position of the adjustable member can be varied from a minimum value up to a maximum angle, i.e., one pitch of a stator tooth, by the ECU as a function of one or more values of the motor control parameters, e.g., rotor speed, torque, induced voltage, etc. The adjustable member can be constructed of powdered magnetic material, for example a soft magnetic composite (SMC), solid magnetic material, or other suitable magnetic material. The individual elements of the adjustable member are connected at one end to an annular, non-magnetic hub that can be selectively rotated with respect to an axis of the electric machine. To control the position of the adjustable member, a rotary-type servo position control mechanism or device or other suitable device can be used.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1C is a partial cross-sectional view of another embodiment of an electric machine in accordance with the invention;

FIG. 2A is a perspective view of an adjustable member usable with the electric machine of FIGS. 1A-1C;

FIG. 2B is another perspective view of the adjustable member of FIG. 2A;

DESCRIPTION OF THE PREFERRED EMBODIMENTS

Figure 1A:
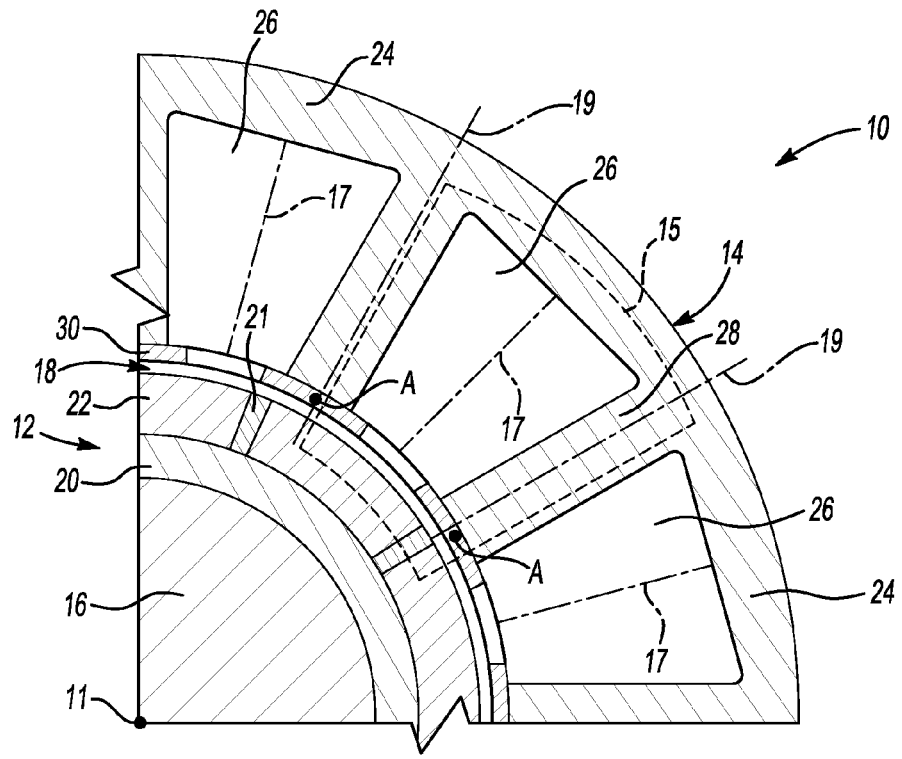
FIG. 1A is a partial cross-sectional view of an electric machine during a low-speed mode in accordance with the invention.

Referring to the drawings wherein like reference numbers correspond to like or similar components throughout the several figures, and beginning with FIG. 1A, a controllable electric motor/generator, hereinafter referred to as an electric machine 10, is shown in partial cross-sectional side view. Within the scope of the invention, the electric machine 10 can be configured for use as a multi-phase alternating current (AC) motor/generator, such as a permanent magnet synchronous motor or other suitable motor/generator device. The electric machine 10 can be configured for any number of applications, including but not limited to vehicular propulsion applications.

The electric machine 10 includes a rotatable portion or rotor 12 and a stationary portion or stator 14. The rotor 12 includes a rotor core 20 and a plurality of rotor teeth 21, with the rotor teeth 21 projecting in a radially-outward direction with respect to an axis 11 of the electric machine 10. The rotor core 20 and the rotor teeth 21 are directly connected to or formed integrally with a rotatable shaft 16 which is configured to rotate about the axis 11 in response to an induced magnetic field, as described below.

The stator 14 includes a stator core 24 and a plurality of radially-inwardly projecting stator teeth 28. The stator teeth 28 are wound with conductive wire (not shown) to form a plurality of stator coils or windings 26 in the spaces or gaps defined between the stator teeth 28. The stator windings 26 are electrically connected to a battery (not shown), such that an electrical current can be directed through the stator windings 26 to thereby induce a magnetic field around each stator winding 26, as represented in FIG. 1A by the magnetic field lines 15.

Still referring to FIG. 1, the electric machine 10 has a variable speed that can be controlled via a motor controller or electronic control unit (ECU) 40 (see FIG. 2B). The electric machine 10 is configured for at least two operating modes: a low-speed mode and a high-speed mode. During the low-speed mode, an adjustable member 30 is aligned with the stator teeth 28 so that primary or main flux, as indicated by the flux path, as indicated by the magnetic field lines 15 of FIG. 1A, totally links the adjustable member 30, the stator core 24, and the rotor core 20.

Figure 1B:
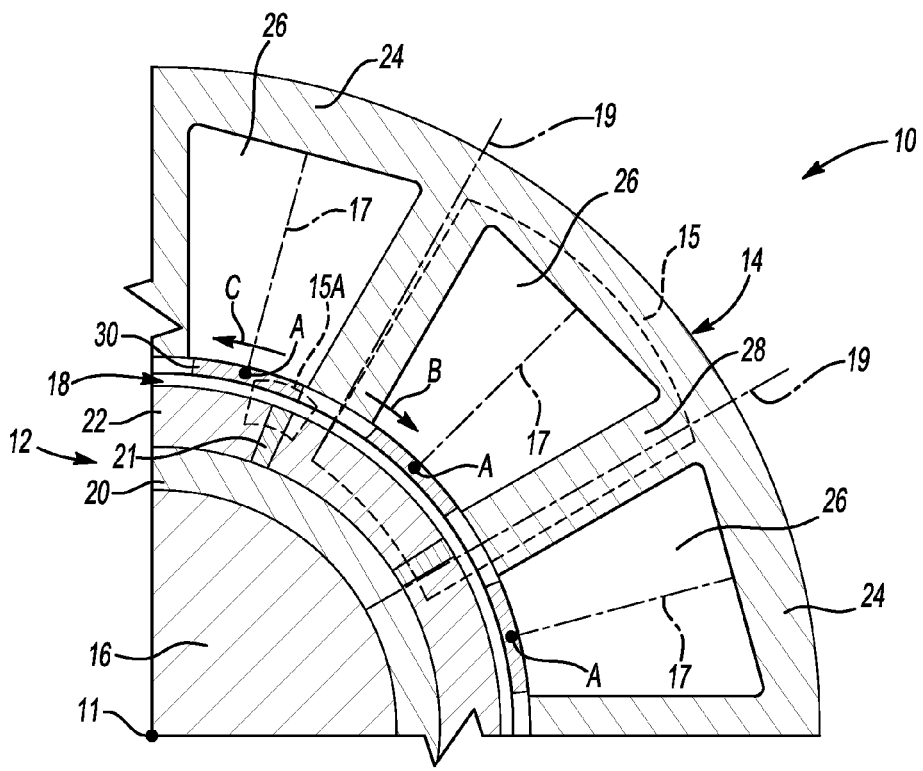
FIG. 1B is another partial cross-sectional view of the electric machine of FIG. 1A during a high-speed mode.

During the high-speed mode, the adjustable member 30 is misaligned with the stator teeth 28 as shown in FIG. 1B. In the high-speed mode, the magnetic flux has two paths: a first path as indicated by the magnetic field lines 15, and a secondary flux path as indicated by a set of secondary magnetic field lines 15A. Unlike the magnetic field lines 15, the secondary magnetic field lines 15A do not link the stator teeth 28, instead passing through the adjustable member 30 and the rotor core 20 to form a flux-reducing closed loop as shown in FIG. 1B. Therefore, the secondary magnetic field lines 15A do not contribute to output torque of the electric machine 10, but rather act as a source of flux leakage to thereby reduce the total amount of magnetic flux linking the stator core 24. Induced output voltage of the electric machine 10 is reduced, thus making motor control possible at a relatively high speed for a fixed bus voltage.

The ECU 40 of FIG. 2B is in electrical communication with one or more sensors (not shown) each adapted to measure, detect, sense, calculate, or otherwise determine a value of a set of motor control parameters (I), also as shown in FIG. 2B. The ECU 40, using one or more of the motor control parameters (I), selectively controls or varies the total magnetic flux ($\Phi_M$) in the electric machine 10 as needed, based at least in part on the rotary speed of the electric machine 10. In this manner, the ECU 40 can achieve a high torque/ampere ratio concurrently with a wide speed range.

Referring again to FIGS. 1A and 1B, in order to selectively adjust the total magnetic flux ($\Phi_M$) within the electric motor 10, the ECU 40 of FIG. 2B. selectively actuates, rotates, or otherwise moves the adjustable member 30 within the electric machine 10, either within an air gap 18 between the stator teeth 28 and a magnetic layer 22 of the rotor 12 as shown in FIGS. 1A and 1B, or in an internal channel 33 of the stator teeth 28 as shown in FIG. 1C. The air gap 18 separates the stator 14 and the rotating members of the electric machine 10, regardless of the configuration of the electric machine 10.

The magnetic flux ($\Phi_M$) passes through the rotor core 20, the magnetic layer 22, the air gap 18, and the stator core 24, thus magnetically linking the induced fields of the various stator windings 26. The induced voltage of the stator 14 is proportional to the total magnetic flux ($\Phi_M$) linking the stator windings 26. Therefore, a controlled offset positioning of the adjustable member 30 affects the magnetic flux ($\Phi_M$) linking the stator windings 26, in whole or in part, with the offset position being determined by the ECU 40 based at least in part on the speed of the electric machine 10. In turn, the control of the magnetic flux ($\Phi_M$) controls the induced voltage within the stator windings 26, as described below with reference to FIG. 4.

Referring to FIG. 1A in particular, exemplary motor control parameters (I) (see FIG. 2B) usable by the ECU 40 of FIG. 2B can include the $i_d$ and $i_q$ commands, i.e., the respective measurable values of commanded flux current ($i_d$) and torque current ($i_q$) within the electric machine 10, as those terms will be understood by those of ordinary skill in the art of electric motor control. Other motor control parameters (I) can include, without being limited to: the rotational speed of the rotor 12 with respect to the axis 11, torque of the rotor 12, system voltage, etc. Therefore, the offset position of the adjustable member 30 is a function of one or more of the motor control parameters (I), including at least the rotary speed of the electric motor 10, i.e., the rotor 12. As used herein, the term "offset position" refers to the relative position of a centerpoint A of the adjustable member 30 with respect to a centerline 17 of a corresponding stator winding 26.

A first offset position of the adjustable member 30 in FIG. 1A is established by the ECU 40 of FIG. 2B during a threshold low-speed operation of the electric machine 10, i.e., a motor speed point falling below a predetermined threshold. FIG. 1A therefore illustrates the low-speed mode described above. The centerpoint A of the adjustable member 30 is positioned along a centerline 19 of the stator tooth 28. In this position, the effective size of the air gap 18 is minimized, which increases the total magnetic flux ($\Phi_M$), thus maximizing the induced voltage.

By way of contrast, and referring to FIG. 1B in particular, a second offset position of the adjustable member 30 can be established during a threshold high-speed operation of the electric machine 10. As shown in FIG. 1B, the centerpoint A of the adjustable member 30 is positioned midway between the centerlines 19 of adjacent stator teeth 28, thus increasing the effective size of the air gap 18. At the same time, the secondary magnetic field lines 15A act to reduce or decrease the total flux linkage between the stator windings 26, effectively acting as a flux leakage in the electric machine 10. Induced voltage is reduced in the high-speed mode as shown in FIG. 1B.

Referring briefly to FIG. 1C, an alternate embodiment of the electric machine 10 rotates or moves the adjustable member 30 within the stator tooth 28, such as through an internal channel 33 or opening formed therein. The stator teeth 28 can be connected to or formed integrally with a flanged end portion 35, with the flanged end portion 35 disposed between the stator tooth 28 and the air gap 18. In this manner, the magnetic flux density ($\Phi_M$) can be affected somewhat differently than the manner enabled by the configuration of FIGS. 1A and 1B.

Referring to FIGS. 2A and 2B, an exemplary claw pole-style embodiment of the adjustable member 30 is shown in perspective view, and includes an annular non-magnetic hub 38 having a center bore 32. The hub is coaxially aligned with the axis 11 of the electric machine 10 (see FIGS. 1A-C), and is configured to selectively rotate about the axis 11 in a manner determined by the ECU 40. The hub 38 is connected to or formed integrally with a plurality of radial arms 34, with each of the radial arms 34 terminating in an axial tab or extension 36. The radial arms 34 and axial extensions 36 are magnetically-permeable, and therefore are constructed of a suitable magnetic material. In various embodiments, the radial arms 34 and the axial extensions 36 can be constructed alternatively of powdered magnetic material, such as soft magnetic composites (SMC) having high magnetic permeability and low core loss, or of laminated or solid magnetic material.

As shown in FIG. 2B, as well as FIG. 2A, the hub 38 can be connected to an actuator (A) 42, the operation of which can be selectively controlled, either directly or indirectly, by the ECU 40 via an algorithm 100, described below with reference to FIG. 3. The actuator 42 can be configured as any rotary-type servo position control mechanism or other device capable of imparting a torque to the hub 38 in either rotational direction. In an exemplary embodiment described below with reference to FIG. 6, the actuator 42 can be configured as a shaped memory alloy (SMA) or other active material to impart the desired movement to the hub 38. However the actuator 42 is ultimately configured, rotation of the hub 38 selectively positions the axial extensions 36 between a fully aligned position as represented in FIG. 1A and a 100% misaligned position as represented in FIG. 1B.

With respect to the ECU 40, this device can include one or more microprocessor units that receive and process the set of motor control parameters (I), as well as other miscellaneous system values as needed, e.g., temperature, regenerative braking feedback signals, etc. The ECU 40 can be configured as a distributed or a central control module having such control modules and capabilities as might be necessary to execute all required motor control functionality in the desired manner.

Likewise, the ECU 40 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Any algorithms resident in the ECU 40 or accessible thereby, including the algorithm 100, can be stored in ROM and executed to provide the respective functionality.

Figure 3:
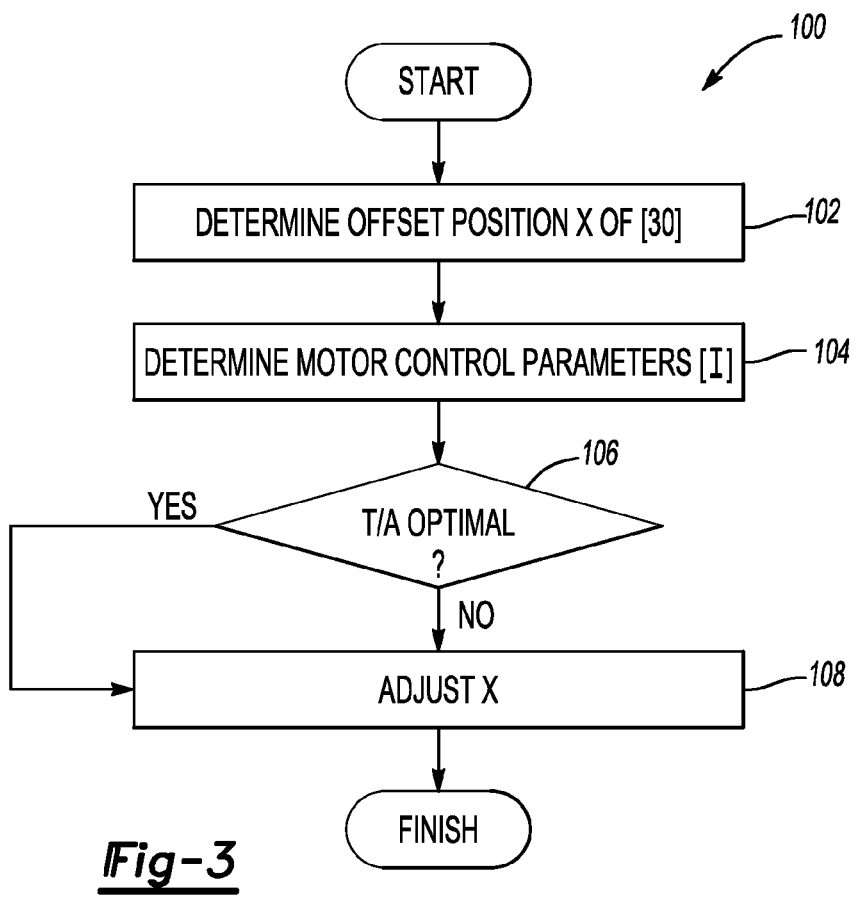
FIG. 3 is a graphical flow chart describing a method for controlling the electric machine of FIGS. 1A-C.

Referring to FIG. 3, and with reference to the structure of the electric machine 10 as shown in FIGS. 1A-C, 2A, and 2B, a motor control method is provided via algorithm 100, which is resident in or accessible by the ECU 40. Execution of the algorithm 100 ultimately positions the adjustable member 30 as needed to achieve the desired torque/ampere ratio in the electric machine 10 of FIGS. 1A-C, i.e., by dynamically varying the geometry of the magnetic flux path in conjunction with speed of the electric motor 10. In this manner, the total magnetic flux ($\Phi_M$) linking the stator windings 26 is selectively controlled or adjusted by variably positioning the adjustable member 30 anywhere in the flux path to thereby link the excitation flux in whole, in part, or not at all, as needed.

Beginning with step 102, the current offset position X of the adjustable member 30 is sensed, measured, calculated, or otherwise determined by the ECU 40. Once known, the algorithm 100 proceeds to step 104.

At step 104, a set of motor control parameters (I) is collected (see FIG. 2B), with the set of motor control parameters (I) potentially including, without being limited to: the $i_d$ and $i_q$ commands, i.e., the respective measurable values of commanded flux current ($i_d$) and torque current ($i_q$) within the electric machine 10, the rotational speed of the rotor 12 with respect to the axis 11, torque of the rotor 12, induced system voltage, etc. Once collected, the algorithm 100 proceeds to step 106.

At step 106, the algorithm 100 determines whether a torque/ampere (T/A) ratio is optimal, with the torque/ampere ratio determined using some or all elements of the set of motor control parameters (I) from step 104. The optimal level can be a calibrated value or range of values stored in memory accessible by the ECU 40, by calculation, and/or by any other suitable means. If the torque/ampere ratio is optimal, the algorithm 100 is finished. Otherwise, the algorithm 100 proceeds to step 108.

At step 108, the ECU 40 automatically adjusts or repositions the adjustable member 30 in response to the determination made at step 106. As noted above, the offset position (X) of the adjustable member 30 can be a function of one or more of the motor control parameters (I), such as a speed of the electric machine 10. The term "offset position" refers herein to the relative position of the centerpoint A of the adjustable member 30 with respect to a centerline 17 of a corresponding stator coil 26. That is, the 0% misaligned/fully aligned position of FIG. 1A represents one limit or extreme, and the 100% misaligned position of FIG. 1B represents the other limit or extreme. Once adjusted, the algorithm 100 is finished.

Figure 4:
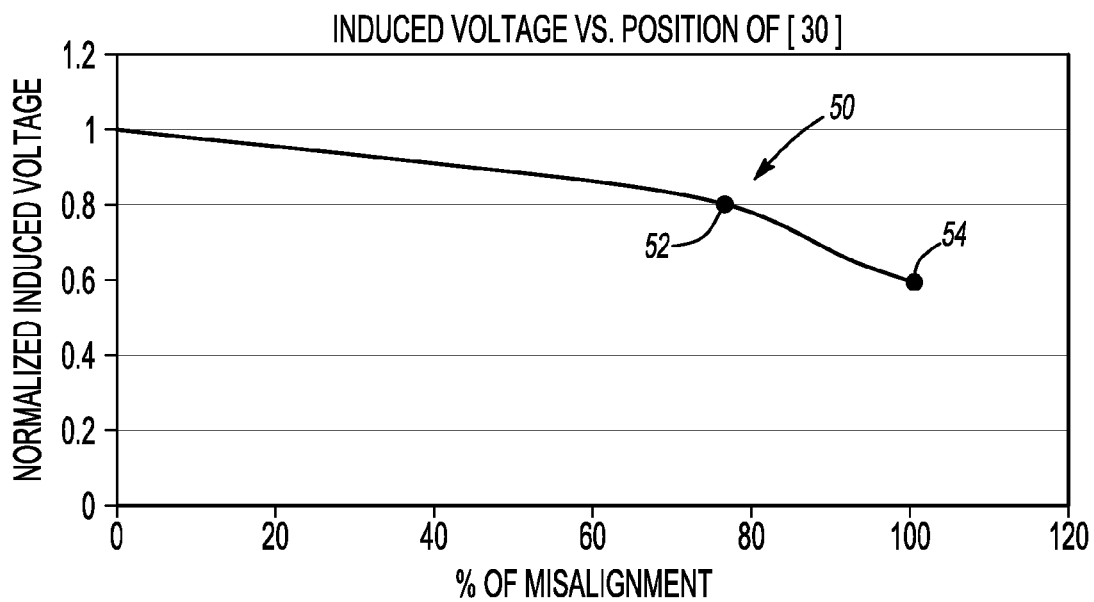
FIG. 4 is a graphical illustration describing a relationship between alignment of the adjustable member of FIGS. 2A and 2B and an induced output voltage in the electric machine of FIGS. 1A-C.

Referring to FIG. 4, a representative curve 50 describes the relationship between the misalignment of the offset position of the adjustable member 30 relative to the stator teeth 28 and a normalized induced voltage resulting from such an alignment. As set forth above, the offset position represented in FIG. 1A is a fully aligned position suitable for low-speed operation of the electric machine 10. At the opposite extreme, the offset position of FIG. 1B is a 100% misaligned position suitable for high-speed operation of the electric machine 10.

As shown in FIG. 4, induced output voltage is at a maximum when the adjustable member 30 is fully aligned with the centerline 19 of the stator teeth 28 per FIG. 1A, slowly dropping until an offset position of approximately 80% misaligned is achieved. After this point, i.e., point 52 along the curve 50, the slope of the curve drops more rapidly until 100% misalignment is achieved at point 54. Therefore, controlled positioning of the adjustable member 30 of FIGS. 2A and 2B, and in particular the axial extensions 36 thereof, can affect the induced voltage of the electric machine 10 in a predetermined manner, thus allowing precise control of the torque/ampere ratio of the electric machine 10.

Figure 5:
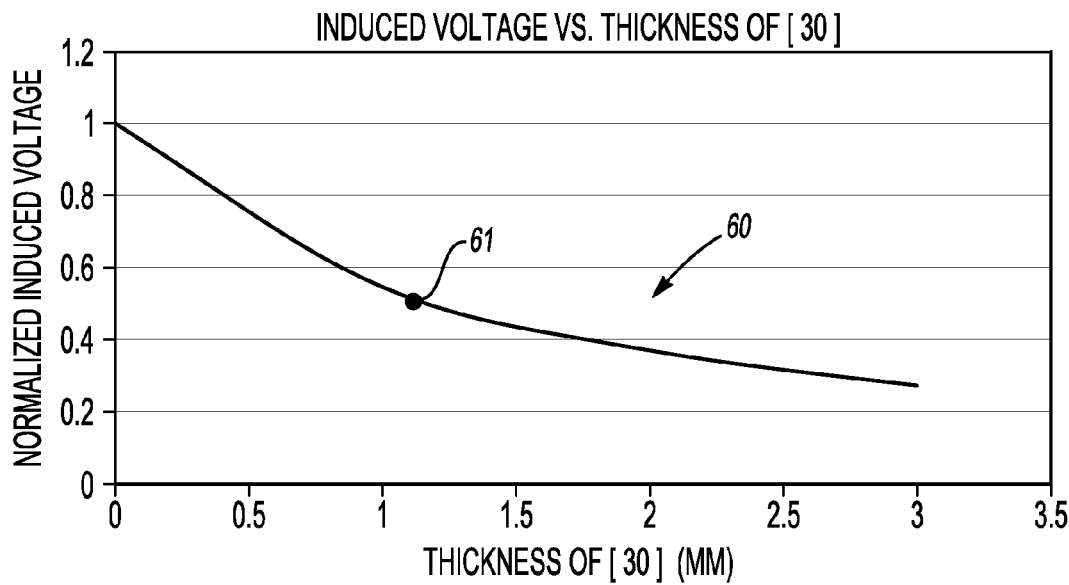
FIG. 5 is a graphical illustration describing a relationship between a thickness of the adjustable member of FIGS. 2A and 2B and an induced output voltage in the electric machine of FIGS. 1A-C.

Referring to FIG. 5, a representative curve 60 describes the relationship between the thickness (T) (see FIGS. 1A and 1B) of the adjustable member and the normalized induced voltage. Induced voltage is inversely proportional to the thickness of the adjustable member 30. That is, beginning at a thickness of 0 mm, i.e., a non-existent adjustable member 30, the normalized voltage is 1. As the thickness (T) is increased, the normalized voltage drops, with the rate of drop increasing after point 61, or approximately 1.25 mm. Therefore, additional precision can be afforded to the motor control enabled by the adjustable member 30 by selecting an appropriate thickness (T) during the design of the electric motor 10.

Figure 6:
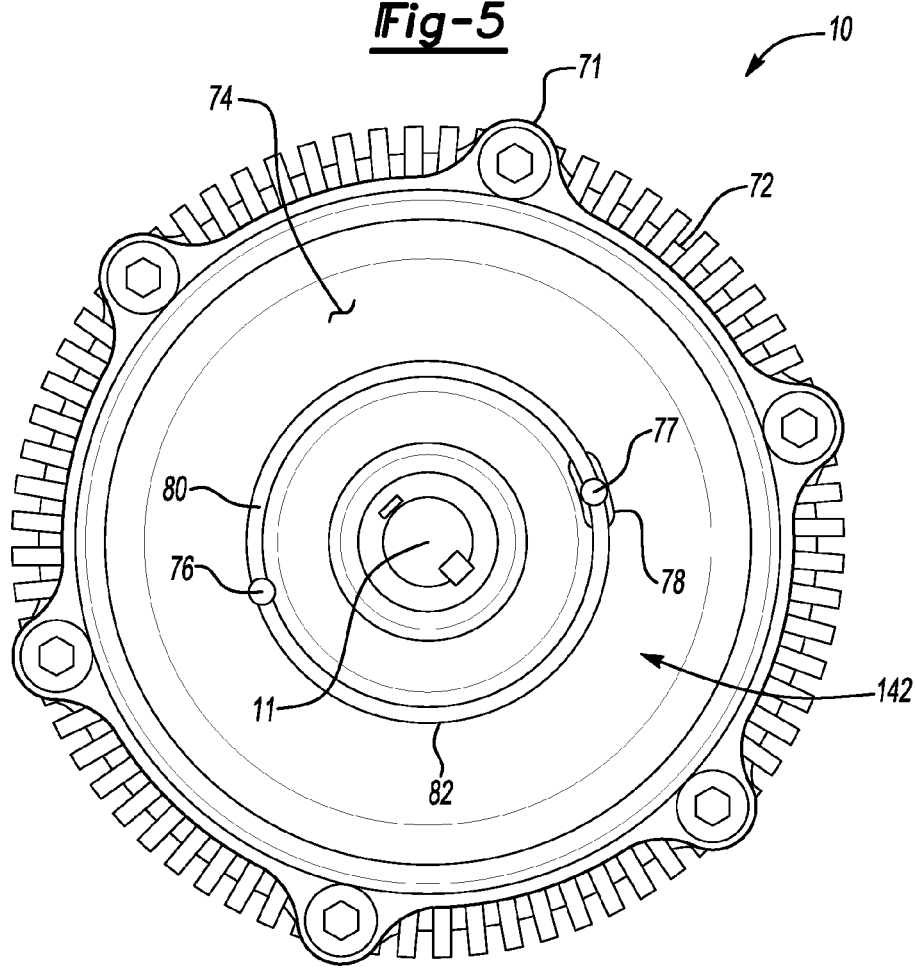
FIG. 6 is a perspective end view of the electric machine of FIG. 1A. having an exemplary shape memory alloy (SMA)-based actuator for positioning the adjustable member.

Referring to FIG. 6, the adjustable member 30 can be actuated or moved using any suitable actuator 42, as noted above with reference to FIGS. 2A and 2B. According to an exemplary embodiment, active materials such as shape memory alloy or SMA can be used as part of an alternate actuator 142. SMA, which are sometimes referred to in the art informally as "smart materials", are materials or compositions exhibiting pseudo-elasticity and shape memory, and thus have the ability to "remember" their original shape. The original shape may be recalled subsequent to a deformation that changes its shape by applying an external stimulus (i.e., an activation signal). As such, deformation of the shape memory material from the original shape can be a temporary and reversible condition.

These capabilities are due, in part, to a temperature and stress-dependent solid-state change of phase due to a cooperative atomic rearrangement. The two phases, i.e. the Martensite (m) phase and the Austenite (a) phase, refer to the lower and higher temperature phases, respectively, in which the phase transformation occurs from a low-symmetry (Martensite) to a highly symmetric (Austenite) crystallographic structure. SMA represent a class of thermally-activated smart materials (TASM) that undergo a reversible phase transformation responsible for stress-induced and temperature-induced recoverable deformation behavior.

The adjustable member 30 shown in FIGS. 1A-1C and 2A-2B can be attached to or formed integrally with an extension or arm 77 that protrudes through an elongated opening or slot 78 formed in a cover, end cap, or wall portion 74 of the electric machine 10 described above. A stationary post 76 forms a fixed attachment point for an SMA actuator portion 80, which is connected to each of the post 76 and the arm 77. A restoring spring 82 likewise extends between the post 76 and the arm 77, in a direction opposite that of the SMA actuator portion 80 as shown in FIG. 5. When electrical current is applied through the terminals of the SMA actuator portion 80, the adjustable member 30 (see FIG. 1A) is pulled by transformation of the SMA actuator portion 80 so that the adjustable member is rotated in the direction of arrow AA. When the electrical current is discontinued, the spring 82 pulls on the arm 77 to thereby move the adjustable member 30 in the direction of arrow BB.

While the best modes for carrying out the invention have been described in detail, those familiar with the art to which this invention relates will recognize various alternative designs and embodiments for practicing the invention within the scope of the appended claims.

The invention claimed is:

1. A method for controlling an electric machine comprising:
   measuring at least one motor control parameter;
   selectively positioning an adjustable member within an annular air gap that is at least partially defined by a plurality of stator teeth and a rotor core of the electric machine in response the at least one motor control parameter; and
   selectively rotating an axial extension of the adjustable member within the annular air gap;
   wherein selectively positioning the adjustable member varies the geometry of a flux path within the electric machine, thereby inducing a predetermined output voltage in the electric machine.

2. The method of claim 1, wherein selectively positioning the adjustable member includes selectively rotating the adjustable member using a rotary servo-type control device.

3. The method of claim 1, wherein selectively positioning the adjustable member includes selectively rotating the adjustable member by energizing a shaped memory alloy (SMA).

4. The method of claim 1, wherein measuring at least one motor control parameter includes sensing a rotary speed of the electric machine.

5. The method of claim 4, wherein selectively positioning the adjustable member includes rotating the adjustable member toward a first position when the rotary speed of the rotor is below a threshold value, and rotating the adjustable member toward a second position when the rotary speed of the rotor is above the threshold value.

6. The method of claim 5, wherein the first position enables a low-speed mode in which a centerpoint of a portion of the adjustable member is fully aligned with a centerline of a stator tooth of the electric machine, and wherein the second position enables a high-speed mode in which the centerpoint of the portion of the adjustable member is fully aligned with a centerline of a stator winding of the electric machine.

7. An electric machine comprising:
   a rotor;
   a shaft operatively connected to the rotor to rotate in conjunction therewith;
   a stator;
   an adjustable member positioned between the rotor and the stator, the adjustable member having a variable offset position, a rotatable, non-magnetic annular hub, a plurality of magnetic radial arms each connected to the hub, and a plurality of magnetic axial extensions each formed integrally with a corresponding one of the magnetic radial arms;
   an actuator configured to selectively position the adjustable member to thereby select the variable offset position, wherein a variation in the variable offset position varies the geometry of a flux path within the electric machine; and
   an electronic control unit (ECU) configured to selectively energize the actuator to select the variable offset position, thereby inducing a predetermined output voltage in the electric machine.

8. The electric machine of claim 7, wherein each of the magnetic radial arms and each of the magnetic axial extensions are constructed at least partially of a powdered magnetic material.

9. The electric machine of claim 7, wherein the actuator is a rotary-type servo position control device.

10. An electric machine comprising:
a rotor;
a shaft having an axis of rotation, the shaft being operatively connected to the rotor and rotatable in conjunction therewith;
a stator having a plurality of radially inwardly-projecting stator teeth, wherein each of the stator teeth defines a respective internal passage;
an adjustable member having an annular hub portion that is coaxially aligned with an axis of the rotor, the adjustable member being positioned between the stator and the rotor and having a variable offset position;
an actuator configured to selectively rotate the adjustable member within the respective internal passages to thereby select the variable offset position; and
an electronic control unit (ECU) operable for varying the variable offset position of the adjustable member in response to a speed of the rotor;
wherein a variation in the variable offset position varies the geometry of a flux path within the electric machine, thereby inducing a predetermined output voltage in the electric machine.

11. The electric machine of claim 10, wherein the adjustable member is at least partially constructed of a soft metallic composite (SMC) material.

12. The electric machine of claim 10, wherein the annular hub portion is non-magnetic.

13. The electric machine of claim 10, wherein the adjustable member has a thickness of approximately 0.5 mm to approximately 3 mm.

14. The electric machine of claim 10, wherein the actuator is a shaped memory alloy (SMA).

15. The electric machine of claim 7, wherein the actuator is a shaped memory alloy (SMA).

* * * * *